Nov. 21, 1944.  R. G. LE TOURNEAU  2,363,071
COMBINED DRAFT AND POWER TAKE-OFF UNIT
Filed March 11, 1942  2 Sheets-Sheet 1
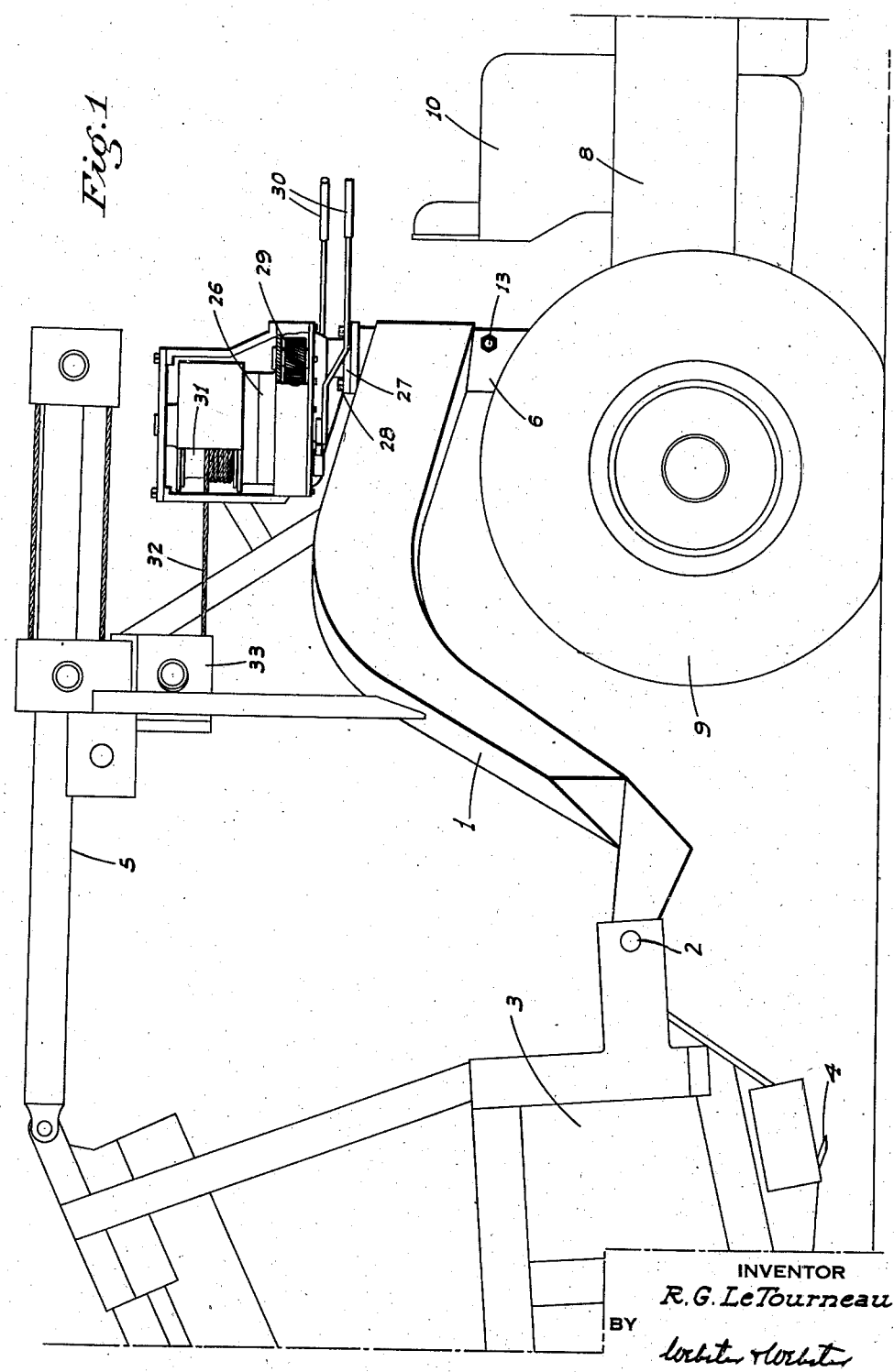
INVENTOR
R. G. LeTourneau
BY
ATTYS

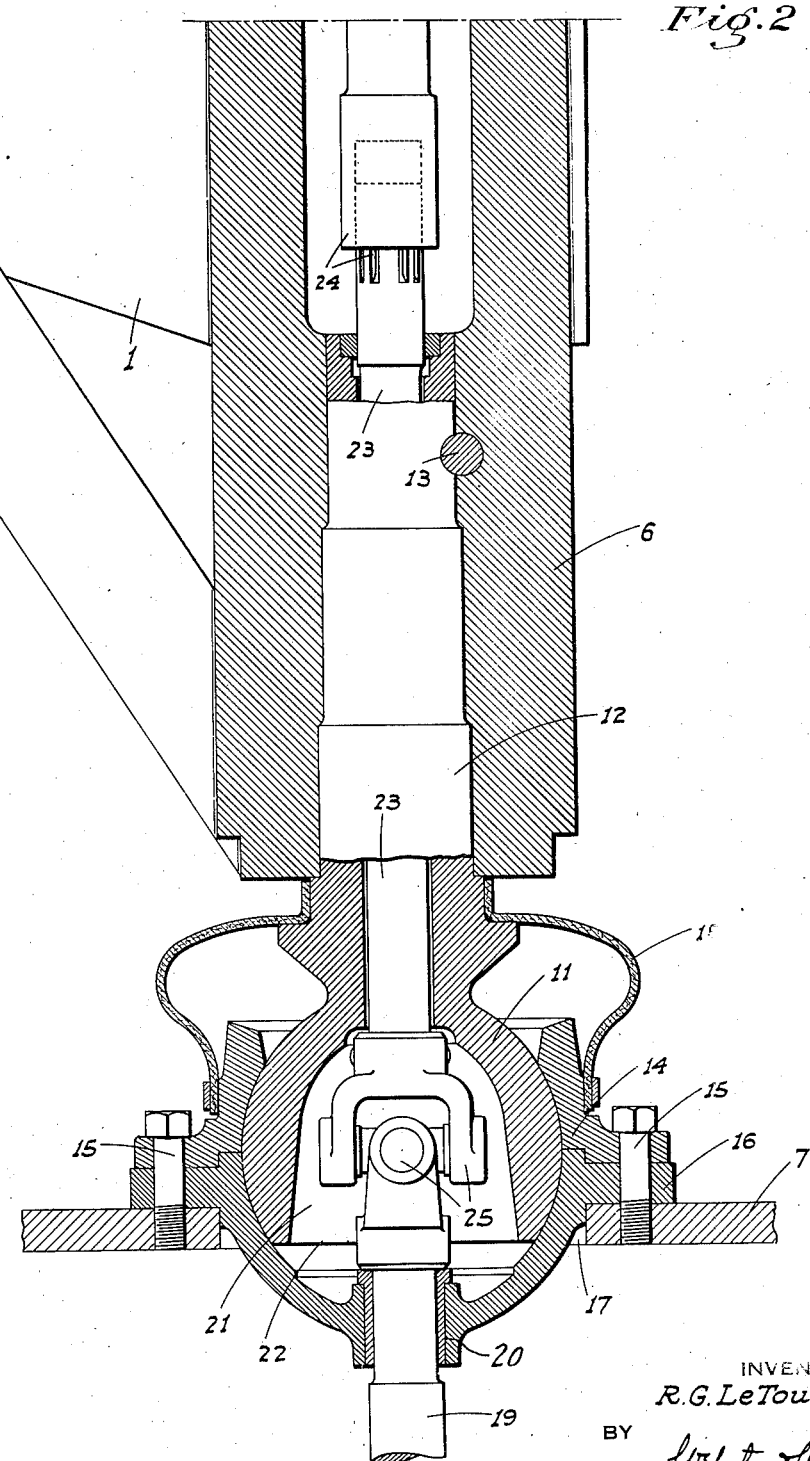

Patented Nov. 21, 1944

2,363,071

UNITED STATES PATENT OFFICE 2,363,071

COMBINED DRAFT AND POWER TAKE-OFF UNIT

Robert G. Le Tourneau, Peoria, Ill., assignor to R. G. Le Tourneau, Inc., a corporation Application March 11, 1942, Serial No. 434,217

5 Claims. (Cl. 180—14)

This invention relates in general to improvements in the power and draft connections between a tractor and trailing implement which carries power controlled instrumentalities, and in particular the invention is directed to, and the principal object is to provide, a unique structure which combines the power and draft connections in a compact, enclosed unitary assembly.

Another object of the invention is to provide a combination power and draft connection, as above, which includes a ball and socket unit mounted in part on the tractor and in part in connection with the tractor whereby to permit of independent tilting and rocking of the tractor and implement when in motion; there being a power take-off shaft extending from the tractor and driving through said ball and socket unit, said shaft having a universal joint therein within the ball and socket unit.

A further object is to provide a draft connection between a tractor and implement, which includes a yoke extending forwardly from the implement to a single universal connection with the tractor; there being a power control unit or cable which mounted on said yoke and being driven by power transmission means extending from the tractor through said universal connection.

It is also an object to mount the power control unit, as in the preceding paragraph, at such point on the yoke, and to arrange the yoke and said universal connection so that regardless of the angle of draft between the tractor and implement the hand levers to control said unit are within easy and convenient reach of the operator's seat on the tractor.

An additional object of the invention is to provide a draft connection which includes a yoke or the like secured to and projecting forwardly from the implement, a rigid vertical post fixed on the front end of said yoke, and a ball and socket connecting between the lower end of said post and the tractor frame at the rear.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the combined draft and power take-off unit in connected relation between a wheeled tractor, and an earth working scraper.

Figure 2 is an enlarged fragmentary sectional elevation of the ball and socket unit and enclosed drive mechanism as mounted between the tractor frame and rigid vertical post.

Referring now more particularly to the characters of reference on the drawings, the numeral 1 indicates a wish-bone type connecting yoke pivoted at its rear ends at laterally spaced points 2 on the forward end of a wheel supported implement, which in the present instance is shown as an earth scraper 3; raising and lowering movement of the scraper at the forward end to control the movement of the cutting blade 4 to and from digging to carrying position being accomplished through the medium of a cable actuated lift control mechanism, generally indicated at 5, and which may be of the type shown in detail in my Patent No. 2,288,630, dated July 7, 1942.

A vertical tubular post 6 is fixed on the forward end of the yoke 1, which is in effect a draft tongue; such post at its upper end terminating adjacent but above the yoke and terminating at its lower end some distance below the yoke. The post 6 is spaced from but overhangs a horizontal sheet steel deck 7 or top of the transmission housing, which is included in the frame 8 of the tractor having rear supporting wheels 9 and an operator's seat 10 mounted on the frame adjacent but ahead of deck 7.

A ball and socket unit is mounted between the lower end of post 6 and deck 7, and comprises a ball member 11 formed with an upstanding tubular neck 12 which projects into the lower end of tubular post 6 in close frictional relation. The neck 12 and corresponding portion of the bore of post 6 are staged as shown to prevent undesirable axial telescoping action and the neck and post are secured together against relative rotation by means of a cross bolt 13.

The ball 11 seats in a segmental socket unit 14 mounted on deck 7 by means of cap screws 15 which extend through cooperating radial flanges 16 of the unit, the deck having a circular opening 17 through which the lower circular portion of the socket unit depends.

A sealing or dust boot 18 of flexible material extends in encircling relation between neck 12 immediately below the lower end of the post and the upper portion of the socket unit above the uppermost radial flange 16. This boot may be secured in place by any suitable means.

The tractor includes a power take-up shaft 19 which extends vertically from within the tractor frame upward to the ball and socket unit. This power take-off shaft 19 is driven and controlled by suitable mechanism on the tractor (not shown). At its upper end power take-off shaft 19 extends centrally through a bearing sleeve 20 in the lower portion of the socket unit 14. The ball member 11 is hollow or chambered as at 21, and is open at its lower end as at 22. Another shaft 23 extends through the tubular post 6 and neck 12 having a separable spline arrangement 24 interposed therein adjacent but above the upper end of neck 12. The lower end of shaft 23 and the upper end of shaft 19 are connected together within ball chamber 21 by means of a universal toggle joint 25.

A power control unit or power winch, indicated generally at 26, is mounted with its axis vertical, on the upper end of tubular post 6, adjacent portions of the power control unit and post being flanged as at 27 and detachably secured together by bolts 28. The upper end portion of shaft 23, which is in effect a stub shaft, extends into the power control unit and is there connected in driving relation with the drive pinion 29 of such unit. The power control unit is arranged with control levers 30 which project forwardly and horizontally in overhanging relation to deck 7 and to a point adjacent seat 10. Each cable drum 31 of the power control unit 26 is likewise disposed with its axis horizontal and the cable 32 runs therefrom rearwardly to the first sheave 33 of the tilt control mechanism 5, and which sheave is disposed adjacent and in substantially the same horizontal plane as drum 31.

In operation the combined draft and power take-off assembly functions to permit the tractor and trailing implement to independently follow ground contours; i. e., tilt or rock relative to each other without binding or straining; this action being accomplished by the use of the ball and socket arrangement between the post 6 on the yoke and deck 7 of the tractor.

At the same time power is transmitted to the power control unit 26 through the assembly of post 6 and the ball and socket unit by means of shafts 19 and 23 coupled within the ball and socket unit by toggle joint 25; the universal action of the latter permitting such transmission of power regardless of the position of the post 6 and ball 11 relative to the tractor deck 7 and socket 14.

While the implement mounted instrumentality is here shown as being the tilt control unit 5, such instrumentality may be any power actuated member or part of the implement or other trailing vehicle connected to the tractor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A combined power and draft connection between a tractor and implement, comprising a tongue pivoted on the implement for relative vertical tilting and extending forwardly, a universal joint connecting the tongue to the tractor, a tilt control mechanism between the tongue and implement, said mechanism including a control cable and normally maintaining the tongue in rigid relation to the implement, a cable winch mounted on the tongue and to which winch said cable is connected, and power transmission mechanism connected between the tractor and said winch, said mechanism in part extending through said universal joint and being arranged for universal movement therewith.

2. In combination with a ground working implement adapted to be drawn by a tractor, a forwardly projecting draft unit pivoted on the forward end of the implement for relative vertical tilting, said draft unit being arranged at its forward end for coupling with the tractor in draft relation, a tilt control mechanism connected between the implement and draft unit, said tilt control mechanism being cable actuated and including a cable extending forwardly above the draft unit, a power winch mounted on and above the draft unit adjacent its forward end, said cable being connected with the winch, and power transmission mechanism supported in part on said draft unit and arranged to connect the tractor in driving relation with the winch when said draft unit is coupled to said tractor.

3. In combination with a ground working implement adapted to be drawn by a tractor, a forwardly projecting draft unit pivoted on the forward end of the implement for relative vertical tilting, said draft unit being arranged at its forward end for coupling with the tractor in draft relation, a tilt control mechanism connected between the implement and draft unit, said tilt control mechanism being cable actuated and including a cable extending forwardly above the draft unit, the draft unit including an upstanding tubular post fixed thereon at its forward end, a power winch mounted on the upper end of said post, said cable being connected with the winch, and power transmission mechanism including a shaft extending downwardly through said post arranged to connect the tractor in driving relation with the winch when said draft unit is coupled to said tractor.

4. In combination with an implement adapted to be drawn by a tractor, the implement including a cable actuated instrumentality, a forwardly projecting draft unit secured to the implement at the front, said draft unit including an upstanding tubular post at its forward end, means to couple said post at its lower end to the tractor, an initially separate power winch including a depending stub shaft, means removably mounting the winch on top of said post with the stub shaft depending thereinto, a cable connecting said instrumentality on the implement and the winch, and power transmission mechanism arranged to connect the tractor in driving relation with said stub shaft when said draft unit is coupled to the tractor; said power transmission mechanism including another shaft projecting upwardly into the post from below, and a separable spline connection between adjacent ends of said stub shaft and other shaft within the post.

5. In combination with an implement adapted to be drawn by a tractor, the implement including a cable-actuated instrumentality, a forwardly projecting draft unit secured to the implement at the front, said draft unit including an upstanding tubular post at its forward end, means to couple said post at its lower end to the tractor, an initially separate power winch including a depending stub shaft, means removably mounting the winch on top of said post with the stub shaft depending thereinto, said means including enlarged matching flanges on adjacent portions of the post and winch detachably secured together in supporting and stabilizing relation to said winch, a cable connecting said instrumentality on the implement and the winch, and power transmission mechanism arranged to connect the tractor in driving relation with said stub shaft when said draft unit is coupled to the tractor; said power transmission including another shaft projecting upwardly into the post from below, and a separable spline connection between adjacent ends of said stub shaft and other shaft within the post.

ROBERT G. LE TOURNEAU.